United States Patent [19]

Caswell

[11] Patent Number: 4,570,965
[45] Date of Patent: Feb. 18, 1986

[54] VEHICLE STEERING MECHANISMS

[75] Inventor: Kennith Caswell, Merthyr Tydfil, England

[73] Assignee: National Research Development Corporation, London, England

[21] Appl. No.: 556,238

[22] PCT Filed: Feb. 9, 1983

[86] PCT No.: PCT/GB83/00036
§ 371 Date: Oct. 11, 1983
§ 102(e) Date: Oct. 11, 1983

[87] PCT Pub. No.: WO83/02758
PCT Pub. Date: Aug. 18, 1983

[30] Foreign Application Priority Data

Feb. 10, 1982 [GB] United Kingdom ............... 8203851

[51] Int. Cl.⁴ .............................................. B62D 13/02
[52] U.S. Cl. ..................................... 280/426; 280/442
[58] Field of Search ................. 280/426, 442, 81 B

[56] References Cited

U.S. PATENT DOCUMENTS 2,793,052  5/1957  Googe .................................. 280/426
2,968,495  1/1961  Hutchens ........................... 280/426
3,322,439  5/1967  LeMmon ............................. 280/426

*Primary Examiner*—Joseph F. Peters, Jr.
*Assistant Examiner*—Donn McGiehan
*Attorney, Agent, or Firm*—Young & Thompson

[57] ABSTRACT

A steering mechanism for a long vehicle having a first steering device located towards the leading end, a steering member located towards the trailing end and so controlled by a second steering device located toward the trailing end that the steering member will act in a steering mode in which it positively steers the trailing end of the vehicle, or in a following mode in which it follows an existing direction which is in a straight line or follows an arc of constant radius and a linkage between the first and second steering devices.

19 Claims, 16 Drawing Figures

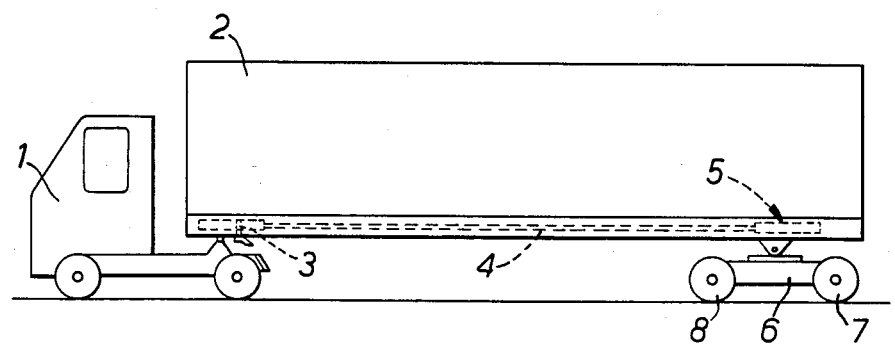
FIG./.
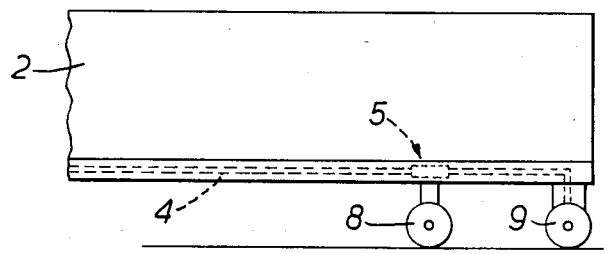
FIG.2.

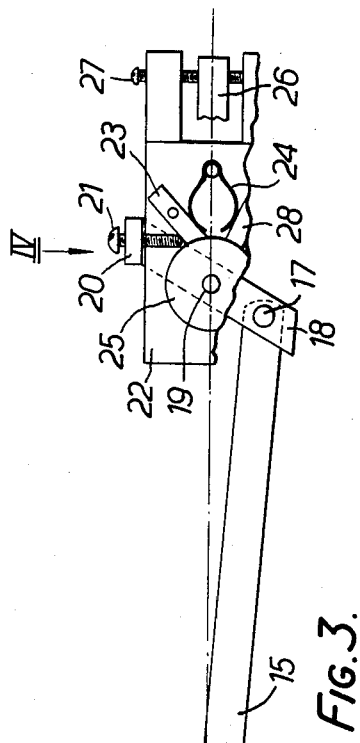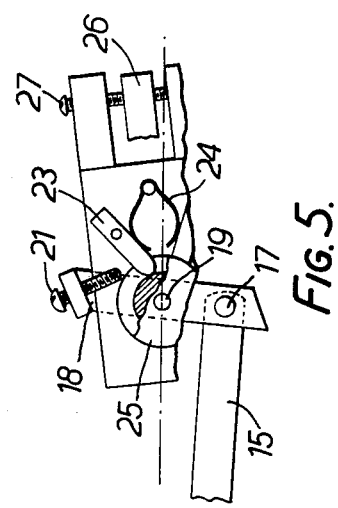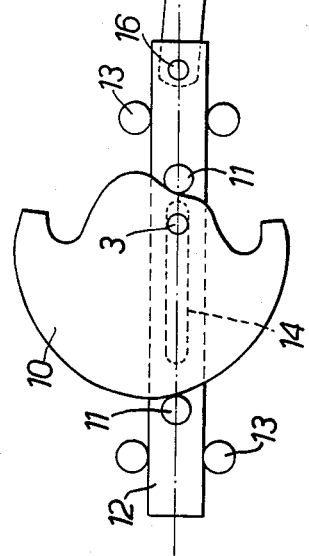

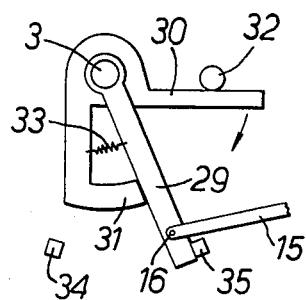
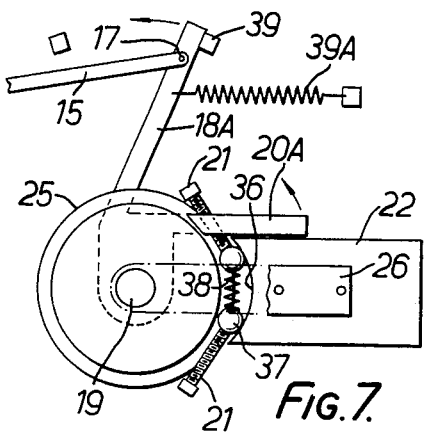
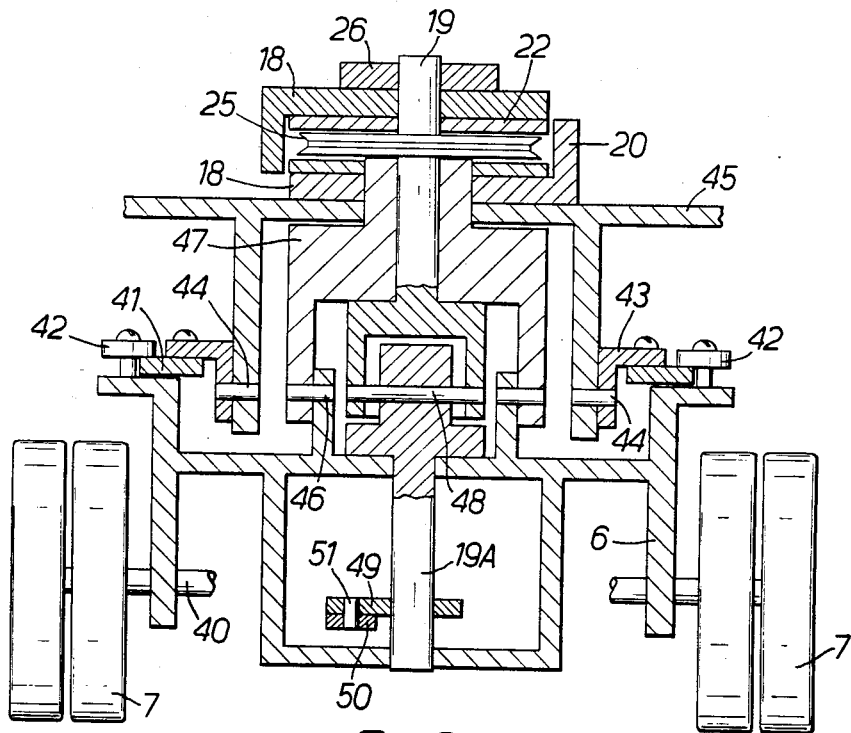

VEHICLE STEERING MECHANISMS

This invention relates to steering mechanisms for steering the rear end of a long vehicle. The invention is more specifically concerned with such vehicles as articulated lorries comprising a cab portion incorporating the engine and a long trailer linked to the cab portion by a pivot device, or even non-articulated cab and trailer combinations. Other possible uses for the steering mechanism are in trailer caravans, tracked vehicles or even such vehicles as boats or ships.

At present an articulated lorry may have wheels on fixed axles situated at the rear of the trailer. When the vehicle negotiates a bend, the rear wheels initially tend to follow the original direction of motion until the rear end begins to slew round into the new direction in which the cab is heading. As a result a long vehicle requires a fairly large turning circle and on tight bends will tend to stray substantially onto the other side of the road. Also undue stresses are applied to the tyres which are rubbed laterally across the road surface and distorted during the turning action so that they are subjected to significant wear. Furthermore, on slippery surfaces, because the rear wheels are tending to slide over the surface, the possibility of jack-knifing occurring is greatly increased.

It is also known to provide a direct steering linkage between the cab and steered rear wheels of the trailer with the result that, as the cab turns relative to the trailer, the rear wheels turn to the same degree at the same time. Consequently the rear end of the trailer tends to be driven immediately towards the outside of the bend thus possibly encroaching over the center line of the road or onto the pavement. Again therefore the driver requires a larger turning circle on the bend.

It is an object of this invention to provide a steering mechanism for a long vehicle which will enable the vehicle more closely to follow curves into the route which the vehicle is taking and will operate automatically to this effect.

Accordingly, this invention provides a steering mechanism for a long vehicle having leading and trailing ends and comprising:

a first steering device located towards the leading end, a steering member located towards the trailing end and so controlled by a second steering device located towards the trailing end that the steering member will act in a steering mode in which it positively steers that end of the vehicle or in a following mode in which it follows an existing direction of motion which is a straight line or follows an arc of constant radius;

a linkage between the first and second steering devices;

actuating means within that linkage, and responsive both to a first angle which the first device makes with the fore-and-aft centreline of the vehicle and a second angle which the second device makes with the same line;

said actuating means operating to cause the second device to make the steering member act in its following mode whenever the second angle is less than a predetermined function of the first angle, but operating under other conditions to cause the second device to make the steering member operate in its steering mode in a manner which tends to achieve equality between the second angle and that function of the first angle.

In the preferred embodiment the second steering device includes a follower member which is freely rotatable about a vertical axis of the vehicle so as to be free to follow an existing direction of motion and forming part of means to steer the steering member, and the actuating means comprises a guide member which is linked with the follower member in the following mode for rotational movement therewith and released from the follower member in the steering mode so as to rotate relative to the follower member and cause adjustment of the steering member.

As a result of the operational relationship between the guide member and the follower member steering of the rear end of the vehicle is delayed until some time after the front of the vehicle has taken a direction with the result that the rear end of the vehicle more nearly follows the path of the front end of the vehicle.

In general it is envisaged that the steering mechanism will incorporate two linkages which are displaced independently as the leading end of the vehicle moves to the right or left respectively, these two linkages preferably operating upon respective locking mechanisms which control the interconnection of the guide member with the follower member and the extent of allowable movement of the guide member. Thus the locking mechanism may comprise a first part which, upon displacement of one of the linkages, locks the guide member against rotation in one direction relative to the follower member, and a second part which, when the guide member has been rotated with the follower member to a condition when the actuating means is in the steering mode, will release the lock between the guide member and the follower member and also prevent further rotation of the guide member in the one direction.

The linkages can be designed to control the state of the locking mechanism, which may take many forms and could therefore be in the form of a clutch, a calliper brake or stepless ratchet. In one arrangement, however, the locking mechanism will incorporate a disc carried by the follower member and gripping members which are biased into locking contact with the disc to prevent rotation of a portion of the guide member in one direction or the other about the axis of the disc. The two linkages will then each incorporate a release member which will act upon the gripping members to release the gripping members from the disc, to enable relative rotation between the guide member and the follower member to take place and thus cause operation of the steering member. These gripping members could comprise arms biased into contact with the surface of the disc or balls biased into contact with the disc by inclined planes.

The linkages may be operated in several ways upon rotation of a member associated with a rotatable part of the first steering device. For example this rotatable part may carry cams which operate on slidably mounted blocks to which the linkages are pivotally connected so that these linkages are displaced as the blocks slide in their tracks.

Alternatively the rotatable part of the steering mechanism could carry arms to which the steering linkages are pivotally connected, these arms being driven round with the rotatable part. It is desirable, however, to provide means for limiting te extent of movement of the linkages, such as by providing a spring connection between the rotatable part or the arms carrying the linkages, and a limit stop.

The first steering device may comprise a steering wheel or tiller, one or more steering axles, a turntable bogie with non-steered axles turned by a drawbar, a turntable bogie which steers itself using one or more steering axles, a pivoted axle or an axle turned by a drawbar, the pivotal interconnection of a driving cab with a trailer, differential drive of left and right non-steered wheels or tracks or in the case of a ship or boat, a rudder or some other rotatable part, which initiates steering of the leading end of the vehicle.

The follower member at the trailing end of the vehicle may comprise a turntable bogie mounted on wheels providing the steering member, a pair of wheels carried by a pivoted axle or a castor-type wheel in the case of a wheeled vehicle. If the vehicle is a ship or boat then the follower member would be in the form of a rudder or vane. The steering member may be carried by the follower member and comprise wheels carried by steered axles or pivoted axles or a power steering member which acts to steer the follower member relative to the vehicle body. Alternatively the turntable bogie or a castor-type wheel may be separate from the steering member in the form of wheels carried by one or more steered or pivoted axles. A further possibility is to provide that the steering member acts on a differential drive using fixed wheels or left and right tracks. In the case of a boat, the steering member would be a further rudder which is large enough to be able to create steerage of the rear of the vehicle. In these instances, the wheels or rudder carried by or comprising the follower member will constitute the steering member which initially tends to follow the original direction of travel of the vehicle.

A desirable feature of the apparatus is the provision of the guide member which will initially move with the follower member but which will subsequently be caused to move relative to the follower member so that the steering member operates to steer the rear of the vehicle.

In most cases it is envisaged that the function of the first angle with the second angle will be a direct one to one function, although there may be occasions where, due for example to limitations of space, a different ratio will be desirable. When the vehicle is negotiating an S-bend, it will be appreciated that if the trailing end has started to be steered to follow the leading end, but the leading end then enters a turn in the opposite direction, the effect will be to put the steering member into the following mode. However since the steering member will already be in a steered state it will move along an arc of constant radius whilst it remains in that following mode.

The invention may be performed in various ways and preferred embodiments thereof will now be described with reference to the accompanying drawings, in which:

FIG. 1 is a side view of an articulated lorry incorporating a steering mechanism of this invention;

FIG. 2 illustrates an alternative form of steering mechanism for the trailer of the vehicle;

FIG. 3 is a plan view of a steering linkage of the mechanism;

FIG. 4 is a detail illustrating the interconnection of a guide member and a disc forming part of the mechanism as viewed in the direction IV in FIG. 3;

FIG. 5 is a plan view of the guide member similar to that of FIG. 3 but in an alternative attitude;

FIGS. 6 and 7 illustrate an alternative form of steering linkage arrangement in plan view;

FIG. 8 is a vertical section through parts of the mechanism interconnecting the guide member and a bogie member;

Figure 9:
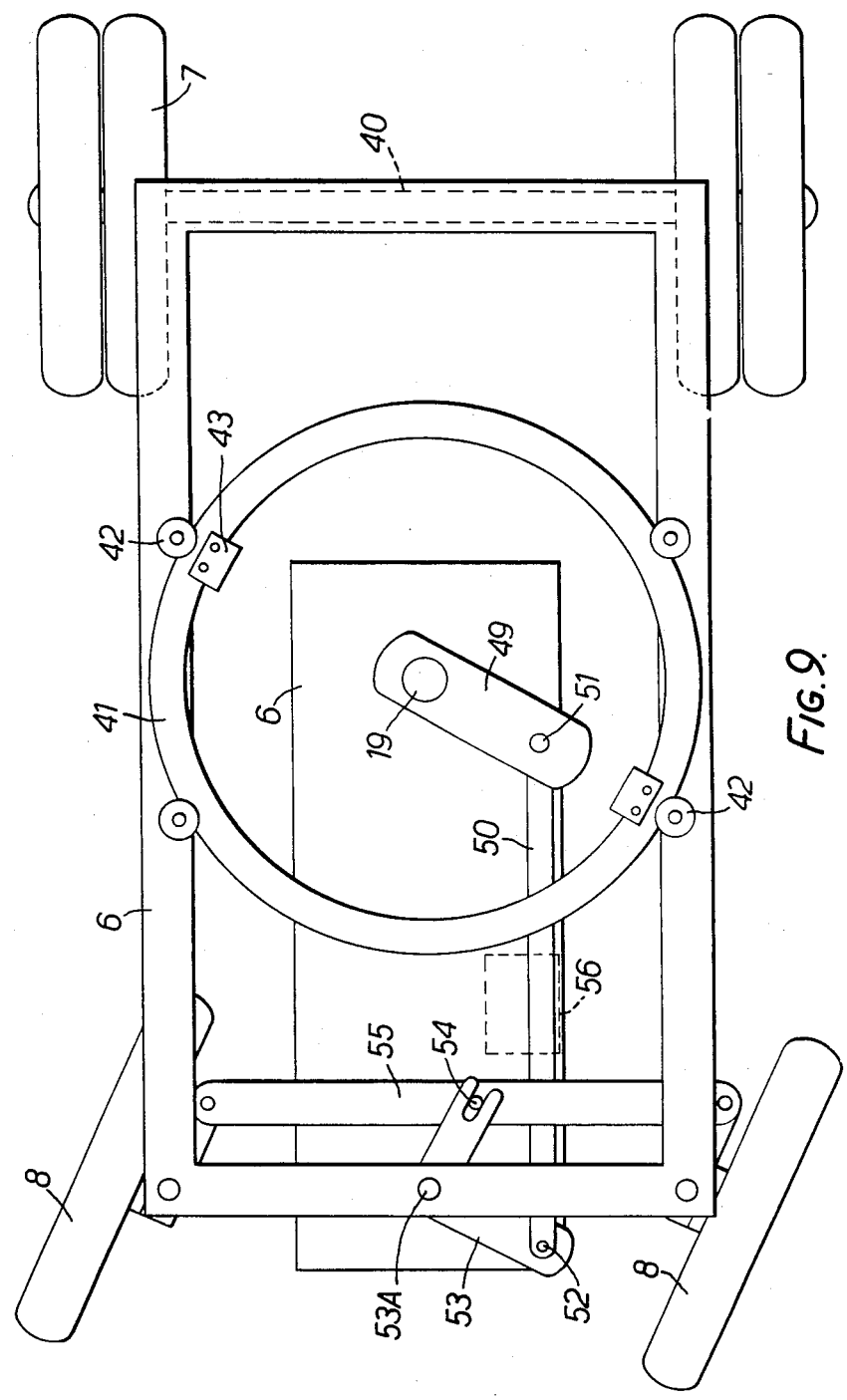
FIG. 9 is a plan view of the bogie member.

In FIG. 1 there is shown an articulated lorry comprising a driven cab portion 1 and a trailer body 2 pivotally interconnected at 3 in a conventional way. A steering linkage 4 leads back from the pivot 3 to a guide member arrangement 5 associated with a pivotally mounted bogie 6 carrying a pair of wheels 7 on a fixed rear axle and a steerable pair of wheels 8 on the forward part of the bogie 6. In the modified arrangement shown in FIG. 2 a castor-type wheel 9 is provided instead of the bogie 6 and rear wheels 7 but this castor-wheel 9 is linked with a modified form of guide member arrangement 5 which is associated with the steerable forward wheels 8.

As shown in FIG. 3, the pivot member 3, which rotates with the cab 1 as the cab is steered into a new direction, has a cam 10 fixed thereto so as to rotate with the pivot member 3. The pivot member 3 also carries a further cam of identical shape but oppositely handed (not shown). The cam 10 acts on a pair of bushes 11 carried by a slidable block 12 guided by rollers 13. A slot 14 in the block allows the block to slide relative to the pivot member 3. The end of the block 12 is connected to a linkage 15 through a pivot 16, the other end of the linkage being connected by a pivot 17 to an arm 18 which itself pivots about a main shaft 19. The arm 18 has an upstanding limb 20 carrying a screw 21. When the limb 20 is situated adjacent the side of a guide member body 22, the screw 21 will contact a pivotally mounted gripping pin 23 biased towards the screw 21 by a spring 24. If the arm 18 is rotated about the shaft 19, the pin 23 is freed by the retraction of the screw 21 but in doing so bears against the surface of a disc 25 which effectively locks the body 22 against further rotation relative to the disc 25. This is illustrated in particular in FIGS. 3 and 4 of the drawings.

An extension portion 26 secured to the shaft 19 is adjustable interconnected with the body 22 by screws 27. Thus when the body 22 is locked to the disc 25 by a gripping pin 23 against rotation in one direction, this effectively interconnects the disc 25 with the shaft 19 during rotation in that particular direction.

A similar construction of the block 12, steering linkage 15, arm 18 with the upstanding limb 20 carrying a screw 21 is interconnected with the oppositely handed cam 10 and acts on the opposite side of the body 22 to control another gripping pin 28. For clarity these additional parts have been omitted from FIG. 3 but the two steering linkages 15 can be seen in FIG. 4.

FIGS. 6 and 7 illustrate a modified arrangement attached to the respective ends of one of the steering linkage 15. Thus, at the forward end of the vehicle, the linkage 15 is connected by the pivot 16 to an arm 29 which rotates freely about the main pivot 3. Another, essentially L-shaped arm 30, has an extension portion 31 which abuts the arm 29 and is also freely mounted about the pivot 3. A pin 32 fixed to the cab acts on the arm 30 to rotate that arm about the pivot 3 when the cab rotates in one direction relative to the vehicle body. A spring 33 causes the arm 29 to be carried round with the arm 30 until the arm 29 meets a stop 34 which inhibits further movement of the steering linkage 15 even if the arm 30 should continue to rotate. (Again the other arm 30, to the other side of the pin 32, and associated parts have been omitted for clarity). A further stop 35 limits the extent of movement of the steering linkage 15 in the other direction, thus ensuring that the pin 32 causes movement of only one of the steering linkages 15.

From FIG. 7 it will be seen that the other end of the steering linkage 15 is connected by the pivot pin 17 to a modified form of arm 18A which is rotatably mounted about the main shaft 19, and which has an upstanding portion 20A carrying a screw 21. In this case, the body 22 does not carry a gripping arm (23) but instead defines inclined planes 36 which, in combination with a face of the disc 25, serve to trap steel balls 37 which are biased away from one another by a spring 38. When the arm 18A moves away from a limit stop 39 to retract one of the screws 21, the associated ball 37 will jam in the narrow space between the inclined plane 36 and the disc 25 and thus effectively lock the body 22 onto the disc 25 against rotation in that direction. Again an extension portion 26 interconnects a body 22 with the main shaft 19. A return spring 39A acts to draw the arm 18A back to the position shown in FIG. 7.

Referring now to FIG. 8, the main shaft 19 defines an axis of rotation of a frame of the bogie 6 (as also shown in FIG. 9). This bogie frame carries the rear wheels 7 on a fixed axle 40 and the steerable wheels 8. A ring 41 is rotatable relative to four retainer members 42 on the frame of the bogie 6 and this ring 41 carries brackets 43 connected by pivot pins 44 to the main chassis 45 of the trailer body. The bogie frame itself is linked by pivot pins 46 to a collar member 47 which is rotatably mounted around the shaft 19 and passes up through the chassis 45 and one of the arms 18 to a point where it is rigidly attached to the disc 25. The disc 25 is situated within the body 22 to which it may be linked by a gripping pin 23, for example, and as previously explained the body 22 is secured to the extension portion 26 which is integral with the shaft 19.

The shaft 19 is connected, via a pivot pin 48, to a lower extension 19A which is journalled in part of the frame of the bogie 6. This shaft extension 19A has a plate 49 attached thereto which in turn is pivotally linked to an arm 50 by a pivot pin 51. This arm 50 (FIG. 9) is in turn connected by a pivot pin 52 to a L-shaped arm 53 which is pivotally mounted at 53A to the frame of the bogie 6. The end of the arm 53 carries a fork which receives a stud 54 on a steering link 55 whose ends control the attitude of the two steerable wheels 8. Thus it will be seen that rotation of the shaft 19 relative to the frame of the bogie 6 will cause the wheels 8 to be steered out of alignment with the rear wheels 7 carried by the bogie. A servo drive 56 may be provided on the arm 50 to cause controlled extension of that arm independent of that due to rotation of the shaft 19 with respect to the bogie 6. This servo would be controlled from the cab of the vehicle and can be actuated as an over-ride during forward drive, and would also be of particular advantage, for example, when reversing the vehicle. Although the servo mechanism 56 has been shown positioned between the plate 49 and the arm 53 it will be appreciated that the linking arm 50 could be extended to the other side of the plate 49 and have a return portion leading back to the pivot pin 51, with the servo mechansim acting on the parts of the arm 50 lying beyond the plate 49.

The operation of the mechanism shown in FIG. 1 to 9 of the drawings will now be explained with reference to FIGS. 10 to 13 of the drawings. These latter Figures comprise just a diagrammatic representation of the cab 1, the trailer body 2, the bogie 6 carrying the rear wheels 7 and steerable front wheels 8, the guide member body 22 and the two limbs 20R and 20L associated with the arms 18 controlled by the steering linkages 15.

Figure 10:
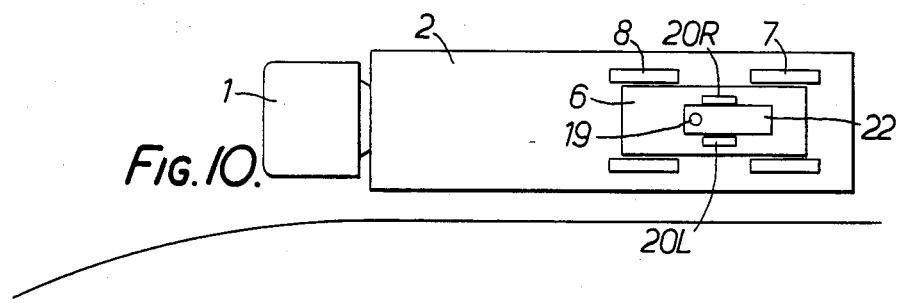
FIGS. 10 to 13 illustrate diagrammatically the sequence of movements of the articulated vehicle when steering is applied to it.
Figure 11:
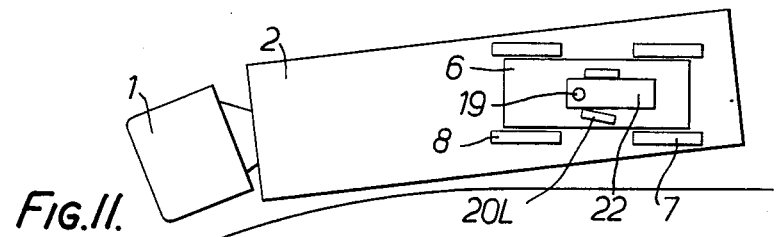
Figure 12:
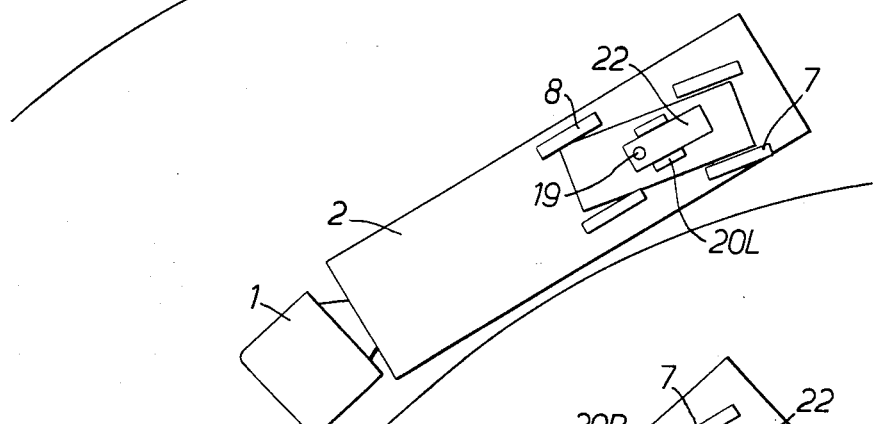
Figure 13:
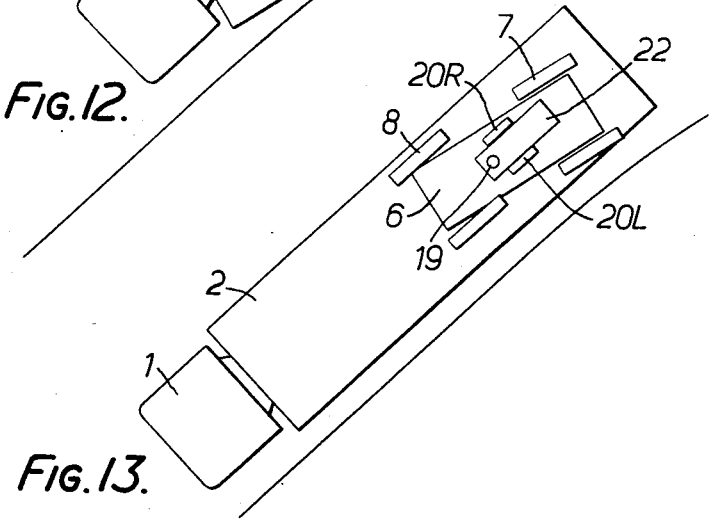

In the position shown in FIG. 10, the vehicle is moving straight ahead, so the bogie 6 and the wheels 7 and 8 are aligned with the vehicle body 2. However when the cab 1 is turned to the left so that the vehicle body 2 tends to follow this new direction of movement (as shown in FIG. 11) the bogie 6 will continue to point in the original direction (as shown) with the front wheels 8 aligned with the bogie. However one of the steering linkages 15 will operate to move the limb 20L away from the guide member 22 so that the guide member 22 is effectively locked with the bogie 6 (through the mechanism illustrated in FIG. 8). After a time, however, the angle between the longitudinal axis of the trailer 2 and the longitudinal axis of the bogie 6 will become equal to or greater than the angle between the longitudinal axes of the vehicle body 2 and the cab 1. This will come about either because the bogie 6 has continued to travel along its original path whilst the cab 1 and body 2 keep on turning round the bend, or additionally because the cab 1 has begun to straighten with respect to the body 2 as the cab portion 1 starts to come out of the bend. As a result the attitude of the bogie 6 relative to the trailer 2 will be such that the limb 20L will now come into contact again with the guide member 22, thus releasing the guide member 22 from the bogie 6 (at least in one direction of rotation) so that the guide member 22 now begins to rotate anti-clockwise with respect to the bogie 6. The guide member 22 will in fact be pushed round by the limb 20L with with it is now in contact. This causes the front wheels 8 to be steered into the direction of the curve taken by the vehicle, as shown in FIG. 12. Eventually as the cab 1 continues again along a straight line path, the guide member 22 will be aligned with the trailer 2 and any misalignment of the bogie 6 will eventually be eliminated since the bogie will be steered back into the aligned position by the wheels 8. This latter stage of the operation is illustrated in FIG. 13.

It will be appreciated that the pivot pins 44, 46 and 48 allow the bogie to pivot with respect to the chassis 45 of the trailer if the vehicle travels over an undulating surface and pivots at these points will be so designed as to be effective even if the bogie 6 is rotated with respect to the trailer body or if the shaft 19 has rotated with respect to the bogie frame.

Figure 14:
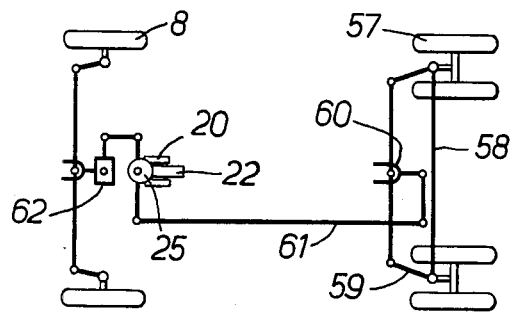
FIG. 14 is an underneath plan view of another form of steering mechanism of the invention.

Whilst FIG. 2 shows a construction having a single castor wheel 9, as shown in FIG. 14, a pair of castor wheels 57 carried by a fixed axle 58 could be provided. These castor wheels will be connected by Ackerman steering arms 59 to a linkage 60 controlling a track rod 61 interconnected with the disc 25. The castor wheels 57 tend to follow the original line of movement of the vehicle even when the trailer body 2 turns about the axis of the disc 25 and the relative rotation of the castor wheel shafts with respect to the body 2 causes rotation of the disc 25 and the associated guide member body 22 until such time as the limbs 20 come into play to stop further rotation of the guide member body 22 resulting in steering being applied to the wheels 8 through a servo mechanism 62, if provided. The single castor-type wheel 9 version described in connection with FIG. 2 is ideally suited to towed trailers and caravans towed by motor cars.

Figure 15:
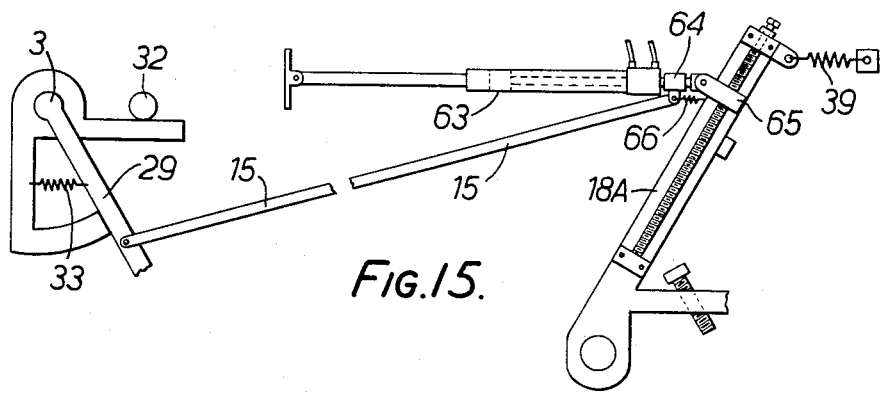
FIGS. 15 and 16 illustrate two further alternative forms of steering linkage arrangements.
Figure 16:
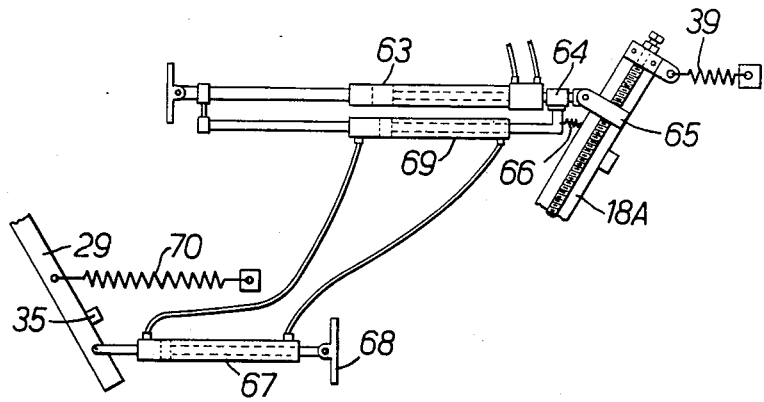

The modified linkage arrangements illustrated in FIGS. 15 and 16 both incorporate actuator rams 63, whose directions of operation on arms 18A are controlled by respective sliding valves 64. The rams 63 are connected to a suitable high pressure oil supply incorporating an electric pump or other pressure inducing mechanism in the cab of the vehicle. Each valve 64 of FIG. 15 is directly actuated by movement of the mechanical steering linkage 15 pivoted to an arm 29. Movement of the valve to the left in the drawing results in the actuator operating to pull the arm 18A to the left until the valve 64 is centralised, and vice versa. The connection to the arm 18A is adjustable by rotating a nut 65 so as to be able to ensure accurate tracking of the rear end of the trailer. A return spring 39 biases the arm 18A to the right and a further return spring 66 between the valve and the arm 18A biases the linkage 15 into the return position, but will of course be weaker in effect than the spring 33. The spring 39 ensures that the arm 18A moves to the return position should the hydraulic supply to the ram 63 fail.

In the alternative arrangement of FIG. 16, the steering linkage 15 is dispensed with and replaced by a master ram 67 pivotally mounted between the arm 29 and part of the vehicle chassis 68 which is interconnected with a slave ram 69 which operates on the sliding valve 64. Otherwise the mechanism operates in a similar manner to that of FIG. 15, except that there is an additional return spring 70 which acts on the arm 29.

If the trailer is to be reversed, then this is best done by retracting both arms 18A (in the examples shown in FIGS. 6, 7, 15 and 16) and the bogie 6 is steered by means of the servo mechanism 56. In arrangements where no turntable bogie is provided (for example FIGS. 2 and 14) the arms 18A are fully closed for reversing, as they are for override control by the driver during forward travel.

It will be appreciated that amongst many other modifications which may be made to the design of the apparatus shown in the drawings, the clutch device as illustrated in FIGS. 3, 4, 5 and 7, for interconnecting the body 22 with the disc 25, may be replaced by other forms of clutch of essentially conventional design, and incorporating releasing members operated upon contact by the adjustable screw 21.

I claim

1. A steering mechanism for a long vehicle having leading and trailing ends and comprising:
    a first steering device located towards the leading end,
    a steering member located towards the trailing end and so controlled by a second steering device located towards the trailing end that the steering member will act in a steering mode in which it positively steers that end of the vehicle or in a following mode in which it follows an existing direction of motion which is in a straight line or follows an arc of constant radius;
    a linkage between the first and second steering devices;
    actuating means within that linkage, and responsive both to a first angle which the first device makes with the fore-and-aft centreline of the vehicle and a second angle which the second device makes the same line;
    said actuating means operating to cause the second device to lock the steering member in its following mode whenever the second angle is less than a predetermined function of the first angle, but operating under other conditions to cause the second device to make the steering member operate in its steering mode in a manner which tends to make the second device progress to a condition wherein equality between the second angle and that function of the first angle is achieved.

2. A steering mechanism according to claim 1, wherein the second steering device includes a follower member which is freely rotatable about a vertical axis of the vehicle so as to be free to follow an existing direction of motion and forming part of means to steer the steering member, and the actuating means comprises a guide member which is linked with the follower member in the following mode for rotational movement therewith and released from the follower member in the steering mode so as to rotate relative to the follower member and cause adjustment of the steering member.

3. A steering mechanism according to claim 1, incorporating two linkages which will be displaced independently as the leading end of the vehicle moves to the right or left respectively.

4. A steering mechanism according to claim 2, incorporating two linkages which will be displaced independently as the leading end of the vehicle moves to the right or left respectively, wherein the two linkages operate upon respective locking mechanisms which control the interconnection of the guide member with the follower member and the extent of allowable movement of the guide member.

5. A steering mechanism according to claim 4, wherein the locking mechanism comprises a first part which, upon displacement of one of the linkages, locks the guide member against rotation in one direction relative to the follower member, and a second part which, when the guide member has been rotated with the follower member, to a condition when the actuating means is in the steering mode, will release the lock between the guide member and the follower member and also prevent further rotation of the guide member in the one direction.

6. A steering mechanism according to claim 4, wherein the locking mechanism is in the form of a clutch, a calliper brake or stepless ratchet.

7. A steering mechanism according to claim 4 or claim 5, wherein the locking mechanism incorporates a disc carried by the follower member and gripping members which are biased into locking contact with the disc to prevent rotation of a portion of the guide member in one direction or the other about the axis of the disc.

8. A steering mechanism according to claim 7, wherein the two linkages each incorporate a release member which will act upon the gripping members to release the gripping members from the disc, to enable relative rotation between the guide member and the follower member to take place and thus cause operation of the steering member.

9. A steering mechanism according to claim 7, wherein the gripping members comprise arms biased into contact with the surface of the disc or balls biased into contact with the disc by inclined planes.

10. A steering mechanism according to claim 3, wherein the linkages are operated upon rotation of a member associated with a rotatable part of the first steering device.

11. A steering mechanism according to claim 10, wherein the rotatable part carries cams which operate on slidably mounted blocks to which the linkages are pivotally connected so that these linkages are displaced as the blocks slide in their tracks.

12. A steering mechanism according to claim 10, wherein the rotatable part of the steering mechanism carries arms to which the steering linkages are pivotally connected, these arms being driven round with the rotatable part.

13. A steering mechanism according to claim 10, including means for limiting the extent of movement of the linkages.

14. A steering mechanism according to claim 13, wherein the limiting means is a spring connection between the rotatable part or the arms carrying the linkages, and a limit stop.

15. A steering mechanism according to claim 2, wherein the follower member comprises a turntable bogie mounted on whells providing the steering member, a pair of wheels carried by a pivoted axle or a castor-type wheel.

16. A steering mechanism according to claim 15, wherein the turntable bogie or a castor-type wheel is separate from the steering member in the form of wheels carried by one or more steered or pivoted axles.

17. A steering mechanism according to claim 2, wherein the steering member is carried by the follower member and comprises wheels carried by steered axles or pivoted axles or a power steering member which acts to steer the follower member relative to the vehicle body.

18. A steering mechanism according to claim 1, wherein each linkage controls the position of a valve which in turn controls the operation of a ram whose position determines engagement or disengagement with the second steering device.

19. A steering mechanism according to claim 18, wherein each linkage is connected to a respective valve by a master and slave ram arrangement.

* * * * *